United States Patent Office 3,106,589
Patented Oct. 8, 1963

3,106,589
FLUORINATED OLEFINS
Murray Hauptschein, Glenside, and Milton Braid, Philadelphia, Pa., assignors to Pennsalt Chemicals Corporation, Philadelphia, Pa., a corporation of Pennsylvania
No Drawing. Filed Sept. 6, 1960, Ser. No. 53,877
6 Claims. (Cl. 260—653.3)

This invention relates to novel fluorinated, terminally unsaturated olefins which are useful as intermediates for the preparation of fluorinated carboxylic acids, nitroalcohols, hydroxy acids, and as co-monomers for copolymerization with other olefins.

The new fluorinated olefins of the invention are those of the general formula:

$$R(CH_2CF_2)_nCH=CF_2$$

where R is a perhaloalkyl or a perhalohydroalkyl radical, the halogens in the radical R being from the group consisting of fluorine, chlorine and bromine; and where $n$ is an integer ranging from 1 to 25 and preferably from about 1 to 10. The perhaloalkyl or perhalohydroalkyl radical preferably contains from 1 to 10 and most desirably from 1 to about 6 carbon atoms. Preferably, the halogens in the radical R are from the group consisting of fluorine and chlorine and most desirably R is a perfluoroalkyl or a perfluorochloroalkyl radical.

As used herein, the term perhaloalkyl means an alkyl radical containing only halogen and carbon. A perhalohydroalkyl radical means one containing only halogen, hydrogen and carbon in which the molar ratio of halogen: hydrogen is at least 1:1. A perfluoroalkyl radical means one containing only fluorine and carbon. A perfluorochloroalkyl radical is one containing only fluorine and chlorine in which the molar ratio of fluorine:chorine is at least 1:1.

These new fluorinated olefins may be prepared by the dehydroiodination of iodides of the formula:

$$R(CH_2CF_2)_nCH_2CF_2I$$

where R and $n$ are as defined above. Iodides of this type may in turn be prepared by reacting an iodide of the formula RI, where R is as defined above, with vinylidene fluoride ($CH_2=CF_2$). Reactions of this type are described in detail in the co-pending application of Hauptschein et al., Serial No. 773,551, filed November 13, 1958, now United States Patent 2,975,220, issued March 4, 1961. As described in that patent, the reaction (usually referred to as telomerization) is preferably carried out by heating the iodide and vinylidene fluoride at temperatures ranging from about 120° to 350° C. and preferably from about 140° C. to about 250° C. preferably under super-atmospheric pressures. The number of vinylidene fluoride ($CH_2CF_2$) units (which are linked together in a straight chain) in the telomer product may be controlled by varying the ratio of $CH_2=CF_2$ to iodide in the reaction mixture. In general the higher this ratio the higher will be the value of $n$. While the telomerization ordinarily produces a mixture of telomers containing varying number of vinylidene fluoride units, individual compounds may be readily separated by fractional distillation as described in the above mentioned patent.

The dehydroiodination of the iodides $$R(CH_2CF_2)_nCH_2CF_2I$$

to produce the terminally unsaturated olefins $$R(CH_2CF_2)_nCH=CF_2$$

may be readily effected by reacting the iodide with an ionic fluoride, chloride or bromide in a liquid medium in which the ionic compound is at least partially soluble. In this reaction, it is believed that a halide ion (i.e. a fluoride, chloride, or bromide ion) is the attacking reagent producing hydrogen halide as a by-product as indicated by the following:

$$—CH_2CF_2I + X^- \rightarrow —CH=CF_2 + HX + I^-$$

where $X^-$ is $F^-$, $Cl^-$ or $Br^-$.

Preferred conditions for this dehydroiodination reaction include the use of a water soluble alkali metal fluoride, chloride, or bromide as the ionic compound, and a polar organic solvent in which both the iodide and the ionic compound are at least partially soluble as the liquid medium. A particularly preferred system is the use of lithium chloride as the ionic compound and dimethyl formamide or dimethyl sulfoxide as the liquid medium. Both the iodides and lithium chloride have good solubility in these solvents, particularly when hot.

To carry out the dehydroiodination, the iodide, the ionic halide and the liquid medium are simply mixed and stirred at temperatures ranging from about 20° C. to 250° C. and preferably from about 50° C. to 175° C. Reaction time is not critical and in most cases reaction periods of from one-half hour to about five hours are satisfactory. Hydrogen halide forms as a by-product and there may be some tendency for the hydrogen halide to add across the double bond formed by the dehydroiodination reaction to produce saturated by-products. For this reason it is desirable to distill out the olefin from the reaction mixture as it is formed, thus removing it from the reaction zone. In the case of the lower molecular weight olefins, distillation of the olefin may occur satisfactorily at atmospheric pressures. In the case of higher olefins, however, it may be desirable to carry out the reaction under a vacuum in order to distill out the product olefin before it has an opportunity to react with the by-product halide. If, because of the relatively high boiling point of the product olefin, it is difficult to remove from the reaction zone by distillation, it may be desirable to add a weak base such as sodium bicarbonate or other reagent that will combine with the hydrogen halide as formed and thus prevent it from adding across the double bond of the product olefin.

The crude product olefin may be purified according to conventional techniques. It may, for example, when a water soluble reaction medium such as dimethyl formamide is employed, be water washed or steam distilled to separate it from the solvent and then fractionally distilled to further purify it.

Further details relating to this dehydroiodination reaction are contained in the copending application of Hauptschein et al., Serial No. 53,878, filed September 6, 1960, for Process for the Preparation of Fluorinated Olefins, and the disclosure of that application is incorporated herein by reference.

Typical examples of the novel olefins of the invention are:

$CF_3CF_2CF_2CH_2CF_2CH=CF_2$
$CF_3CF_2CF_2(CH_2CF_2)_2CH=CF_2$
$CF_3CF_2(CH_2CF_2)_3CH=CF_2$
$C_3F_7(CH_2CF_2)_5CH=CF_2$
$CF_3CH_2CF_2CH=CF_2$
$CF_3(CH_2CF_2)_2CH=CF_2$ $$CF_3\underset{|}{C}FCH_2CF_2CH=CF_2 \atop CF_3$$

$$CF_3\underset{|}{C}FCH_2CF_2CH=CF_2 \atop CF_2Cl$$

$$C_2F_5\underset{|}{C}F(CH_2CF_2)_2CH=CF_2 \atop CF_3$$

$$CF_3\underset{|}{C}F(CH_2CF_2)_2CH=CF_2 \atop CF_2Cl$$

$$CF_2Br\underset{|}{C}FCH_2CF_2CH=CF_2 \atop CF_3$$

$CF_2ClCFCl(CH_2CF_2)_3CH=CF_2$
$CF_2ClCHClCH_2CF_2CH=CF_2$
$CF_3CHFCH_2CF_2CH=CF_2$

The following examples are intended to illustrate the invention:

Example 1

A mixture of 30 grams (0.07 mole) of the iodide $CF_3CF_2CF_2(CH_2CF_2)_2I$, 6 grams (0.14 mole) of lithium chloride and 30 milliliters of dimethyl formamide is placed in a 250 milliliter flask equipped with a stirrer, thermometer well and short distillation column leading directly to a cooled trap. The reaction temperature is gradually raised to 155° C. over a period of two hours with stirring. Distillation of the product olefin from the reaction mixture is evident at 90° to 100° C. The reaction mixture turns a dark red during the reaction, the color becoming a light yellow at the end. There is obtained 18.5 grams (90% yield) of the olefin $$CF_3CF_2CF_2CH_2CF_2CH=CF_2$$

having a boiling point of 93° to 94° C. *Analysis.*—Calculated for $C_7H_3F_{11}$: C, 28.4; H, 1.02. Found: C, 28.8; H, 1.10.

Example 2

A mixture of 97.6 grams (0.2 mole) of the iodide $CF_3CF_2CF_2(CH_2CF_2)_3I$, 12.6 grams (0.3 mole) of lithium chloride and 100 milliliters of dimethyl formamide is heated with stirring at 150° C. for 3 hours. The mixture is then poured into a liter of water and steam distilled. A water-insoluble oil separates and is washed with a dilute sodium bisulfite solution and then dried over anhydrous magnesium sulfate. A pale yellow oil (64.5 grams, 90% yield) is obtained which is redistilled to provide a major fraction consisting of the olefin $$CF_3CF_2CF_2(CH_2CF_2)_2CH=CF_2$$

boiling at about 65° at 35 mm. Hg.

Example 3

130 grams of a mixture of telomer iodides of the formula $CF_3CF_2CF_2(CH_2CF_2)_nI$, where $n$ ranges from 1 to about 4 is mixed with 21 grams of lithium chloride and 150 milliliters of dimethyl formamide and the resulting mixture placed in a flask equipped with a stirrer and small distillation column. The reaction mixture is gradually heated from room temperature to 155° C. and an overhead distillate is collected. When no further product distills over at 155° C. the reaction mixture in the flask is poured into water and steam distilled.

The overhead distillate is washed with water and dried over anhydrous magnesium sulfate and then redistilled to separate the following fractions:

(*a*) A fraction boiling at 37° C. consisting of the olefin $CF_3CF_2CF_2CH=CF_2$.

(*b*) A fraction boiling at 93° C. consisting of the olefin $CF_3CF_2CF_2CH_2CF_2CH=CF_2$.

The residue from this redistillation and the steam distillate recovered from the reaction mixture are combined and separated by distillation into the following fractions:

(*c*) A fraction boiling at approximately 65° C. at 35 mm. Hg consisting essentially of the olefin $$CF_3CF_2CF_2(CH_2CF_2)_2CH=CF_2$$

(*d*) A residue boiling at approximately 70° C. at 10 mm. Hg consisting mostly of the olefin $$CF_3CF_2CF_2(CH_2CF_2)_3CH=CF_2$$

Example 4

A mixture of 52 grams (0.16 mole) of the iodide $CF_3CH_2CF_2CH_2CF_2I$, 10 grams (0.24 mole) of lithium chloride and 75 milliliters of dimethyl formamide is placed in a flask equipped with a distillation column, stirrer and thermometer well. While applying a slight vacuum to this system, the mixture is heated with stirring gradually from room temperature to 150° C. The olefin product begins to distill over at 50 to 60° C. and condenses in a Dry-Ice cooled trap. The product is washed with water and dried over anhydrous magnesium sulfate. There is obtained approximately 28 grams (89% yield) of the olefin $CF_3CH_2CF_2CH=CF_2$ boiling at 58° C., the infrared spectrum of which shows a strong peak at 5.69μ in the vapor phase. *Analysis.*—Calculated for $C_5H_3F_7$: C, 30.63; H, 1.54; Found: C, 30.92; H, 1.68.

Example 5

Using the same equipment and procedure as in Example 4, a mixture of 96 grams (0.25 mole) of the iodide $CF_3(CH_2CF_2)_2CH_2CF_2I$, 21 grams (0.5 mole) of lithium chloride and 150 milliliters of dimethyl formamide is heated with stirring from room temperature to 160° C. over a period of 2.5 hours. Distillation of the olefin product occurs mostly at 100° C. to 130° C. From this reaction there is obtained 15 grams (30% yield) of the olefin $CF_3(CH_2CF_2)_2CH=CF_2$ boiling at 120° C. *Analysis.*—Calculated for $C_7H_5F_9$: C, 32.3; H, 1.94; F, 65.7. Found: C, 32.3; H, 2.13; F, 65.6.

There is also obtained from this reaction approximately 50% conversion of the starting iodide to the chloride: $CF_3(CH_2CF_2)_3Cl$ apparently formed by the addition of the by-product hydrogen chloride to the olefin.

Example 6

Example 5 is repeated under the same conditions except that the reaction is carried out under reduced pressure causing the product olefin to distill off more rapidly at a lower temperature. This results in an increased yield of the olefin and a decreased yield of the by-product chloride.

Example 7

A mixture of the iodide $$C_2F_5\underset{|}{C}F(CH_2CF_2)_2CH=CF_2 \atop CF_3$$

and lithium chloride (molar ratio of LiCl:iodide of 1.5:1) in dimethyl formamide is heated with stirring to a temperature of 150° C. for 2 hours. The reaction mixture is then poured into a liter of water and steam distilled. A water insoluble oil separates which is washed with dilute sodium bisulfite solution and then redistilled. The olefin $$C_2F_5\underset{|}{C}F(CH_2CF_2)_2CH=CF_2 \atop CF_3$$

is obtained boiling at approximately 75° C. at 30 mm. Hg.

Example 8

A mixture of the iodide $$CF_3\underset{|}{C}F(CH_2CF_2)_2CH_2CF_2I \atop CF_2Cl$$

and lithium chloride (molar ratio of LiCl to iodide of 1.5:1) in dimethyl formamide is heated from room temperature to 150° C. over a period of 2½ hours. The reaction mixture is then poured into water and steam distilled. A water insoluble oil separates which is washed with sodium bisulfite solution and then redistilled. The olefin $$CF_3\overset{\overset{\displaystyle CF_2Cl}{|}}{C}F(CH_2CF_2)_2CH=CF_2$$

boiling at approximately 75° C. at 25 mm. Hg is obtained.

*Example 9*

A mixture of the iodide $CF_2ClCFCl(CH_2CF_2)_4I$ and lithium chloride (molar ratio of LiCl:iodide of 1.5:1) in dimethyl formamide is heated with stirring from room temperature to 150° C. over a period of 3 hours. The reaction mixture is poured into water and steam-distilled, whereupon a water insoluble oil separates. The water insoluble oil is washed with sodium bisulfite solution, and then redistilled. The olefin $$CF_2ClCFCl(CH_2CF_2)_3CH=CF_2$$

boiling at approximately 75° C. at 10 mm. Hg, is obtained.

The fluorinated terminally unsaturated olefins of the invention are useful intermediates for the preparation of many valuable compounds. By oxidation at the double bond, for example, in the presence of an aqueous potassium permanganate solution, fluorinated carboxylic acids may be produced having one less carbon than the corresponding olefin of the following type:

$$R(CH_2CF_2)_nCOOH$$

where R is as previously defined. Such acids, and their water soluble derivatives, such as their alkali metal salts, where the number of carbon atoms in the molecule is five or more, have valuable surface active properties which are greatly enhanced by the fluorine atoms which they contain.

As well as being useful surface active materials, the acids derived from the olefins of the invention may be converted to fluorinated esters which are useful as lubricants and plasticisers of good chemical stability. Thus, the diester of the acid $C_3F_7(CH_2CF_2)_2COOH$ with pentamethylene glycol; viz.

$$C_3F_7(CH_2CF_2)_2\overset{\overset{\displaystyle O}{||}}{C}-O-(CH_2)_5-O-\overset{\overset{\displaystyle O}{||}}{C}(CF_2CH_2)_2C_3F_7$$

is an excellent synthetic lubricant of enhanced chemical stability due to the presence of the fluorine atoms. Diesters of this type are also useful as plasticisers for fluorinated resins, particularly polyvinylidene fluoride.

The novel fluorinated olefins of the invention are also useful as intermediates for the preparation of new fluorinated nitroalcohols of the general formula $$R(CH_2CF_2)_n\overset{\overset{\displaystyle}{|}}{\underset{\underset{\displaystyle OH}{|}}{C}}HCF_2NO_2$$

These nitroalcohols are prepared by the addition of dinitrogen tetroxide to the fluorinated olefins as disclosed and claimed in the copending application of Murray Hauptschein et al., entitled Fluorinated Organic Compounds, Serial No. 128,646, filed August 2, 1961. Such fluorinated nitroalcohols are useful as thermally stable lubricants, hydraulic fluids and heat transfer fluids. They are unusually stable to acids, showing no decomposition when heated to boiling with concentrated sulfuric acid. By similar procedures fluorinated hydroxy acids of the formula $$R(CH_2CF_2)_n\underset{\underset{\displaystyle OH}{|}}{C}HCOOH$$

may also be prepared from the olefins of the invention.

The fluorinated olefins of the invention are also useful as comonomers for copolymerization with other olefins, particularly fluorinated olefins such as vinylidene fluoride, tetrafluoroethylene, fluorinated butadienes and fluorinated styrenes to give in many cases elastomeric resins of good chemical stability.

This application is a continuation-in-part of the prior copending application Serial No. 773,551 of Murray Hauptschein et al., filed November 13, 1958.

We claim:

1. Fluorinated, terminally unsaturated olefins of the formula:

$$R(CH_2CF_2)_nCH=CF_2$$

where R is selected from the class consisting of perhaloalkyl and perhalohydroalkyl radicals wherein the halogens in said radicals are selected from the class consisting of fluorine, chlorine and bromine and where *n* is an integer from 1 to about 25.

2. Fluorinated olefins in accordance with claim 1 in which *n* is an integer from about 1 to 10.

3. Fluorinated olefins in accordance with claim 1 in which the radical R contains from 1 to about 10 carbon atoms.

4. Olefins in accordance with claim 1 in which R contains from about 1 to 6 carbon atoms.

5. Fluorinated terminally unsaturated olefins of the formula:

$$R(CH_2CF_2)_nCH=CF_2$$

where R is a perfluoroalkyl radical having from 1 to about 6 carbon atoms and where *n* is an integer ranging from about 1 to 10.

6. Fluorinated terminally unsaturated olefins of the formula:

$$R(CH_2CF_2)_nCH=CF_2$$

where R is a perfluorochloroalkyl radical containing from 1 to 6 carbon atoms and where *n* is an integer ranging from 1 to about 10.

References Cited in the file of this patent

UNITED STATES PATENTS

| | | |
|---|---|---|
| 2,880,247 | Miller | Mar. 31, 1959 |
| 2,875,253 | Barnhart | Feb. 24, 1959 |

OTHER REFERENCES

Hauptschein et al.: J.A.C.S., vol. 80, pp. 846–51, March 1958.